INVENTOR,
RAYMOND W. WARREN

United States Patent Office 3,718,150
Patented Feb. 27, 1973

3,718,150
FLUID STEPPING MOTOR
Raymond W. Warren, McLean, Va., assignor to the United States of America as represented by the Secretary of the Army
Filed June 30, 1971, Ser. No. 158,322
Int. Cl. F15c 3/00
U.S. Cl. 137—829                                    4 Claims

ABSTRACT OF THE DISCLOSURE

A fluid stepping motor for providing a rotary mechanical output for a fluidic digital logic system. A rotor having a plurality of vanes radially disposed a pivotable shaft is driven in a stepping fashion by fluid impulses issuing from a drive conduit connected to an output channel of a bistable fluid amplifier. After impinging upon one of said plurality of vanes, the fluid stream issuing from the drive conduit enters a receiver conduit that is connected to a control channel of the fluid amplifier causing it to switch its output to a hold conduit. The hold conduit is positioned in the rotor so as to establish an equilibrium position for an advancing vane. The vane is held in that position until a signal is applied to the other control channel of the bistable amplifier, whereupon the foregoing process is repeated. Each time a pulse is applied to the control input of the system, the rotor will advance one step and provide an output indication at the central shaft. The control input may be provided by any conventional pulsed device.

RIGHTS OF GOVERNMENT

The invention described herein may be manufactured, used, and licensed by or for the United States Government for governmental purposes without the payment to me of any royalty thereon.

BACKGROUND OF THE INVENTION

Field of the invention

This invention relates to stepping devices and more particularly to a fluid stepping motor which provides a rotary mechanical output for a fluidic digital logic system.

Description of the prior art

A stepping motor in general is defined as one whose output shaft rotates through a fixed angle in response to an input pulse. The main advantage of a stepping motor is that it is able to operate in an open-loop servosystem. Since there is no check on the load position in such a system, the system accuracy is solely a function of the motor's ability to step through the exact number of steps commanded at the input. The vast majority of stepping motors utilized in industry today are of the electro-mechanical type, i.e. those that translate an electrical pulse input into a mechanical angular output at a rate determined by the input pulse frequency. See, for example, Understanding Digital Stepping Motors, Electronic Products Magazine, August 1970, pp. 99–105. As a link between electronic and mechanical elements, stepping motors have long been used in machine tool control and in military equipment. Recent trends are, however, leading to much wider use in data logging and other instrumentation activities, and in computer peripherals. The rising demand for high-speed, high-power stepping motors has led to the recent development of electro-hydraulic stepping motors to position a hydraulic control valve, which in turn controls a hydraulic motor. Typical of such applications is a numerical control system that utilizes a digital computer as a central processor to manipulate a machine tool wherein the speed with the machine tool slide is positioned determines the work output of the tool.

Pure fluid control systems have recently gained wide popularity in industrial production and digital logic systems, due primarily to their low cost, ease of manufacture, absence of moving parts, and high reliability. Corresponding to the increase in acceptance of pure fluid control systems has been a demand for a reliable, low-cost fluid stepping motor that will serve much the same purpose in a fluid control system as the aforedescribed electric stepping motors served in the corresponding electro-mechanical and electro-hydraulic control systems. That is, the advent of the fluidic art emphasizes the need for a fluidic device that transforms a fluid pulse input into a rotary mechanical output for use in fluidic digital logic and control systems.

It is therefore a primary object of the present invention to provide a fluid stepping motor that transforms a fluid pulse input into a rotary mechanical output.

Another object is to provide a fluid stepping motor that has high reliability, low cost, and is amenable to fluidic digital logic and control systems.

A further object of the present invention is to provide a highly reliable fluid stepping motor that transduces each fluid pulse at its input into an angular mechanical output at a rate that is directly proportional to the frequency of the fluid input pulses.

An additional object of the present invention is to provide a stepping motor that transforms a fluid pulse input into a rotary mechanical output that contains a minimum of moving parts, is highly rugged, and is not subject to deterioration or wear.

SUMMARY OF THE INVENTION

Briefly, in accordance with the invention, a fluid stepping motor is provided that comprises a bistable fluid amplifier, means for controlling the issuance of fluid from said amplifier, and a rotary mechanical output device that accepts fluid impulses from the output channels of the amplifier in such a manner so as to give a mechanical stepping output indication upon the application of each fluid pulse to the control means. The rotary mechanical output device typically comprises a rotor having a plurality of vanes radially connected to a pivotable shaft wherein any motion imparted to the vanes will be transmitted to the shaft to provide an angular output indication. One of the output channels of the fluid amplifiers is connected to a drive conduit that is positioned within the rotor so that fluid issuing therefrom impinges upon one of said vanes during each alternating drive cycle so as to advance the rotor at a certain angular distance. A receiver conduit is positioned within the rotor and senses when said angular movement is underway, causing said fluid amplifier to switch outputs from the drive conduit to a hold conduit. The fluid jet issuing from the hold conduit is directed within the rotor so as to establish equilibrium position of an advancing vane prior to the application of a control pulse that will initiate the drive cycle once more. The establishment of an equilibrium position defines the end of one step in the movement of said rotor or the completion of one drive cycle. This position of equilibrium will bring another vane of the rotor in a position relative to the drive conduit ready to receive the next pulse command.

BRIEF DESCRIPTION OF THE DRAWINGS

The specific nature of the invention as well as other objects, aspects, uses, and advantages thereof will clearly appear from the following description and from the accompanying drawings, in which.

DESCRIPTION OF THE PREFERRED EMBODIMENT

Figure 1:
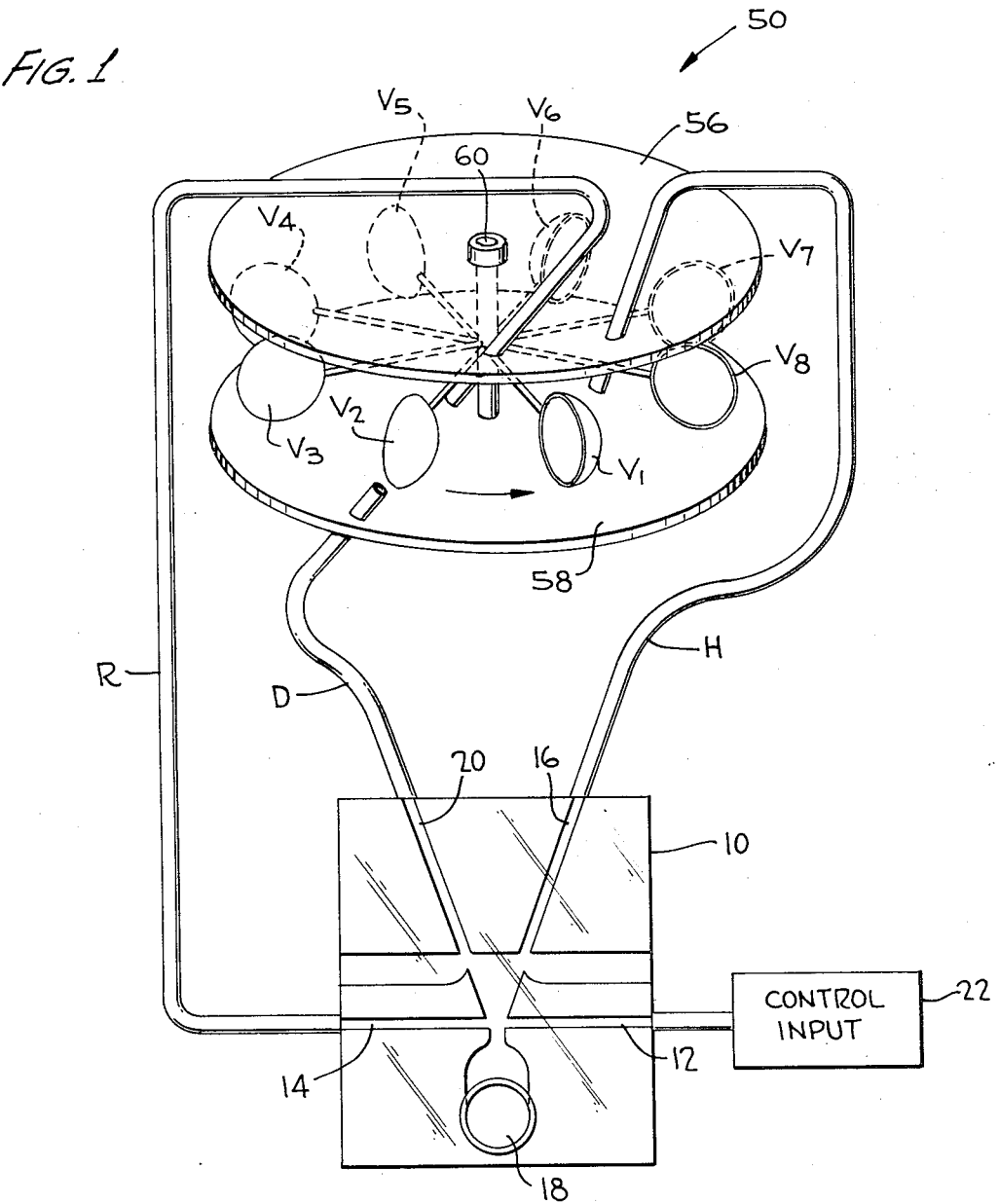
FIG. 1 illustrates a fluid stepping motor in accordance with a preferred embodiment of the present invention.

In FIG. 1 is shown the preferred embodiment of the fluid stepping motor of my invention basically comprising a bistable fluid amplifier 10, a control input device 22, and a rotary mechanical output device represented at 50. Bistable fluid amplifier 10 is of the well-known boundary layer controlled type wherein a fluid power stream obtained from power input 18 is directed in the well-known manner to an interaction chamber where a control input from either the left control channel 14 or the right control channel 12 will impinge upon the power stream and deflect it to either the left output channel 20 or the right output channel 16 as is well taught in the prior art. Control input 22, which may be any one of a number of well-known fluid pulse devices, is connected to right control actuated, the fluid jet in right control channel 12 will switch the power stream from right output channel 16 to left output channel 20. A receiver conduit R provides a control input fluid pulse to left control channel 14, as will be explained more fully hereinafter, whereupon the power stream will be deflected from left output channel 20 to right output channel 16.

Left output channel 20 and right output channel 16 of amplifier 10 are connected to a drive conduit D and a hold conduit H, respectively. The output orifices of drive conduit D and hold conduit H are positioned within rotary mechanical device 50 in a manner that will be more fully explained hereinafter. Rotary mechanical device or rotor 50 typically comprises a plurality of vanes, such as V1 . . . V8, which are radially connected to a pivotable shaft 60 that is held in place by a top plate 56 and a base plate 58. Vanes V1 . . . V8 are free to rotate within the confines of plates 56 and 58 and are connected to shaft 60 such that any motion imparted to the vanes will be transmitted to shaft 60. Shaft 60 may extend beyond either or both of plates 56 and 58 so that its movements may be monitored by an indicator device or coupled to a suitable output mechanical device. The vanes are shown in FIG. 1 as being eight in number for illustrative purposes only, and it will be apparent that any convenient number of vanes will work equally well within the context of the present invention. Receiver conduit R is also positioned within rotor 50 and its other end is connected as aforementioned to left control channel 14 of amplifier 10. The orifices of drive conduit D and receiver conduit R are positioned within rotor 50 to be substantially in line with one another, while leaving enough clearance for vanes V1 . . . V8 to freely move therebetween. Thus, it will be noted that the output orifice of drive conduit D is positioned within rotor 50 at such an angle so that if a fluid jet is issuing therefrom it will strike the concave side of any vane that happens to be positioned along the line connecting the orifices of drive conduit D and receiver conduit R. The orifice of receiver conduit R is positioned through top plate 56 of rotor 50 at an angle such that absent the presence of a vane, the fluid jet issuing from drive conduit D would enter receiver conduit R. The orifice of hold conduit H is positioned through top plate 56 of rotor 50 in the direction of rotation of the vanes relative to drive conduit D. Its angular positioning with respect to the vanes and the general operation of the device of the present invention can be more fully understood with reference to FIGS. 2, 3 and 4.

Figure 2:
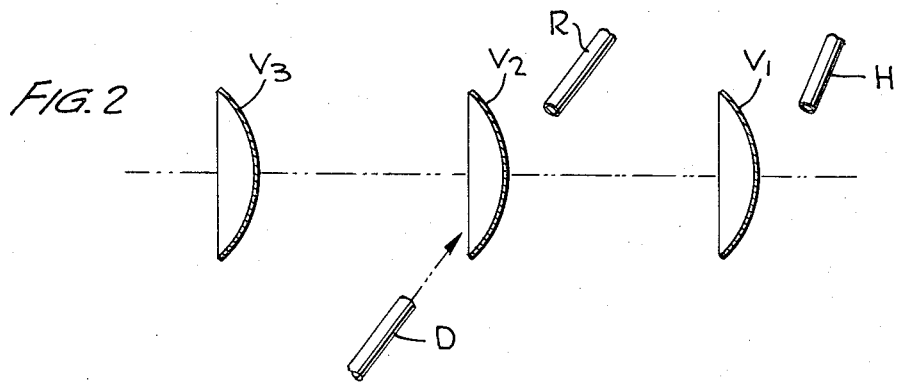
FIG. 2 illustrates in a schematic view a particular sequence in the operation of the fluid stepping motor of FIG. 1.
Figure 3:
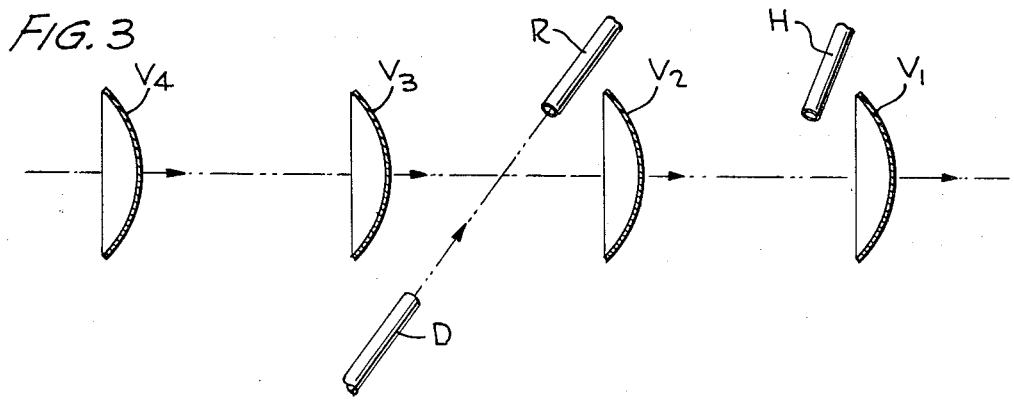
FIG. 3 is a schematic representation of a dynamic sequence in the operation of the fluid stepping motor of FIG. 1.
Figure 4:
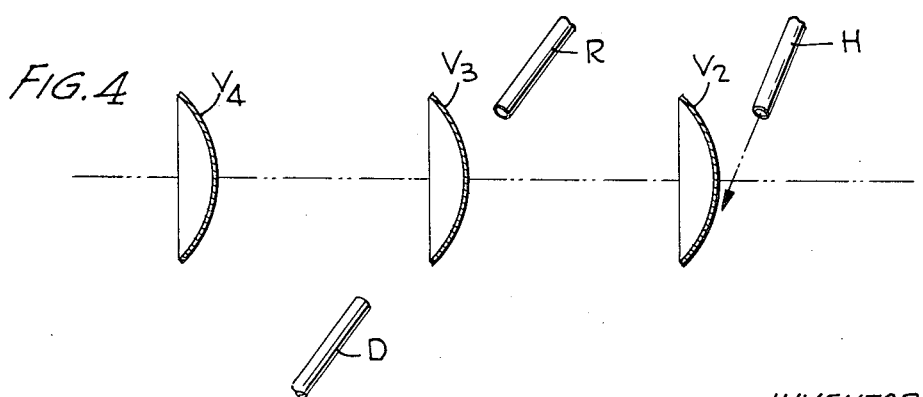
FIG. 4 is a schematic illustration of a position of stable equilibrium during the operation of the fluid stepping motor of FIG. 1.

FIG. 2 shows a schematic representation of vanes V1, V2 and V3 of rotor 50 in FIG. 1, and the relative placement of the orifices of drive conduit D, receiver conduit R and hold conduit H. In the particular state of operation depicted in FIG. 2, it is assumed that vanes V1, V2 and V3 are in a stationary position and that a fluid pulse has been applied by control input device 22 to the right control channel 12 of amplifier 10 causing the fluid power stream issuing from input 18 to exit along left output channel 20 and to drive channel D. It is apparent from FIG. 2 that the fluid jet issuing from drive conduit D will impinge upon the concave surface of vane V2 with sufficient force to move vane V2 until it is clear from the path of the exiting jet from drive channel D, as depicted in FIG. 3. FIG. 3 illustrates the particular moment in time at which vane V2 has cleared the path of the fluid jet issuing from drive conduit D. Due to the alignment of drive conduit D and receiver conduit R as shown in FIG. 3, the fluid jet will enter receiver conduit R and be fed back to amplifier 10 via left control channel 14 as shown in FIG. 1, causing amplifier 10 to switch its output from left output channel 20 to right output channel 16. After the switching operation, the fluid jet will enter hold conduit H and be fed to rotor 50, as is evident from FIG. 1. While the switching operation is taking place in bistable amplifier 10, vane V2 will be progressing in the direction towards hold conduit H, thus approaching the position depicted in FIG. 4. The fluid jet issuing from hold conduit H will blow on the convex side of vane V2 as shown in FIG. 4, and will entrain fluid between the fluid jet and vane V2 thereby reducing the pressure. The reduced pressure between the fluid jet and vane V2 will move the jet toward the vane and, as the vane is free to rotate, will move the vane toward the jet. If vane V2 attempts to pass through the jet issuing from hold conduit H, the force of the jet on the outer portion of vane V2 will stop the vane's movement and tend to force it into an equilibrium position. The force on the convex side of vane V2 tending to repel the vane will balance the force on the concave side of the vane tending to attract the vane. Thus an equilibrium position will be established for the rotor as shown in FIG. 4 which is illustrative of the completion of one step or cycle in the operation of the device of the present invention. Rotor 50 is thus held in one exact position ready to receive the next control command from control input device 22 which will switch the output of amplifier 10 from hold conduit H to drive conduit D to repeat the foregoing cycle. Each time a pulse is emitted from control input 22 of amplifier 10, it is apparent that rotor 50 will advance one step. It is seen that this cyclical operation will repeat itself at a rate determined by the frequency of application of pulses via control input device 22, thus providing a rotary mechanical stepping output at shaft 60 corresponding to a fluid pulse input at control input device 22 in accordance with the present invention.

It is thus seen that I have provided a unique fluid stepping motor that is rugged, reliable, has no moving parts other than the output rotor, is simple to construct and is of low cost. The rate of response is limited only by the mechanical considerations in the rotor device. The fluid stepping motor of the present invention will find broad use in fluid and digital logic control systems.

I wish it to be understood that I do not desire to be limited to the exact details of construction shown and described, for obvious modifications will occur to a person skilled in the art.

I claim as my invention:

1. A fluid stepping motor, comprising:
   (a) a bistable fluid amplifier having a power source for establishing a continuous power stream, first and second output channels, and first and second control channels;
   (b) a rotor having a plurality of vanes radially connected to a pivotable shaft;
   (c) a drive conduit for directing the fluid from said first output channel towards one of said vanes;

(d) a receiver conduit positioned to receive the fluid from said drive conduit after its inpingement upon said one of said vanes and to deliver said fluid to said first control channel whereby said power stream of said amplifier is caused to switch from said first output channel to said second output channel; and (e) means connected to said second output channel for causing said rotor to cease rotating in a predefined position.

2. The invention according to claim 1 wherein said means connected to said second output channel comprises a hold conduit for directing the fluid issuing therefrom towards one of said vanes so as to create a low pressure region adjacent thereto and thus establish an equilibrium position of said vane.

3. The invention according to claim 2 further comprising a control input device connected to said second control channel for causing said power stream to switch from said second output channel to said first output channel upon the issuance of a fluid signal therefrom.

4. The invention according to claim 3 wherein said vanes on said rotor advance one step upon each actuation of said control input device.

References Cited

UNITED STATES PATENTS

| 3,480,208 | 11/1969 | Goodykoontz | 235—201 FS |
| 3,439,695 | 4/1969 | Bauer | 137—81.5 |
| 3,554,058 | 5/1969 | Newell | 137—81.5 X |
| 3,124,160 | 3/1964 | Zilberfarb | 137—81.5 |
| 3,370,906 | 2/1968 | Bauer | 235—201 R |

SAMUEL SCOTT, Primary Examiner